(12) United States Patent
Weintraub (10) Patent No.: US 10,591,076 B2
(45) Date of Patent: Mar. 17, 2020

(54) LOW FRICTION HYDRAULIC CIRCUIT CONTROL COMPONENTS

(71) Applicant: Proserv Operations, Inc., Houston, TX (US)

(72) Inventor: Preston Weintraub, Spring, TX (US)

(73) Assignee: PROSERV OPERATIONS, INC., Houston, TX (US)

( * ) Notice: Subject to any disclaimer, the term of this patent is extended or adjusted under 35 U.S.C. 154(b) by 53 days.

(21) Appl. No.: 15/705,013

(22) Filed: Sep. 14, 2017

(65) Prior Publication Data
US 2018/0073652 A1    Mar. 15, 2018

Related U.S. Application Data

(60) Provisional application No. 62/394,798, filed on Sep. 15, 2016.

(51) Int. Cl.
| | |
|---|---|
| *E21B 34/04* | (2006.01) |
| *F16K 25/00* | (2006.01) |
| *F16K 11/065* | (2006.01) |
| *F17C 13/04* | (2006.01) |
| *F16K 1/36* | (2006.01) |
| *F16K 1/30* | (2006.01) |

(52) U.S. Cl.
CPC ........... *F16K 25/005* (2013.01); *E21B 34/04* (2013.01); *F16K 11/065* (2013.01); *F16K 1/303* (2013.01); *F16K 1/36* (2013.01); *F17C 13/04* (2013.01)

(58) Field of Classification Search
CPC . E21B 34/04; F17C 13/04; F16K 1/36; F16K 1/303
See application file for complete search history.

(56) References Cited

U.S. PATENT DOCUMENTS

| | | |
|---|---|---|
| 402,600 A | 5/1889 | Kemp |
| 1,654,642 A | 1/1928 | Geissinger |
| 2,140,735 A | 12/1938 | Gross |
| 2,311,851 A | 2/1943 | McClure |
| 2,560,841 A | 7/1951 | Bishop |
| 2,605,108 A | 7/1952 | Stephens |
| 2,685,296 A | 8/1954 | Boosman |
| 2,729,226 A | 1/1956 | Jones |
| 2,799,523 A | 7/1957 | Parker |
| 2,811,979 A | 11/1957 | Presnell |
| 2,821,972 A | 2/1958 | Banker |
| 2,847,027 A | 8/1958 | Kumpman |
| 2,862,520 A | 12/1958 | Cordova |

(Continued)

FOREIGN PATENT DOCUMENTS

| | | | |
|---|---|---|---|
| CH | 469928 A | * 3/1969 | ............... F16K 1/34 |
| CH | 469928 A | 3/1969 | |
| DE | 102014224979 A1 | 6/2016 | |

OTHER PUBLICATIONS

PCT International Search Report and Written Opinion dated Dec. 1, 2017, for International Application No. PCT/US2017/061567.

(Continued)

*Primary Examiner* — Matthew W Jellett
*Assistant Examiner* — Christopher D Ballman
(74) *Attorney, Agent, or Firm* — Patterson + Sheridan, LLP (57) ABSTRACT

A hydraulic control circuit component such as a valve is configured which sliding surfaces. At least one of the sliding surfaces is configured as a single crystal material, such as ruby or sapphire.

16 Claims, 8 Drawing Sheets

(56) References Cited

U.S. PATENT DOCUMENTS

| | | | |
|---|---|---|---|
| 2,867,463 A | 1/1959 | Snider | |
| 2,892,644 A | 6/1959 | Collins | |
| 2,906,290 A | 9/1959 | Harding et al. | |
| 2,973,746 A | 3/1961 | Jupa | |
| 3,022,794 A | 2/1962 | Pippenger | |
| 3,114,391 A | 12/1963 | Kurtz | |
| 3,145,723 A | 8/1964 | Chorkey | |
| 3,189,049 A | 6/1965 | Carlson | |
| 3,225,786 A | 12/1965 | Elliott | |
| 3,316,930 A | 5/1967 | Garduer | |
| 3,352,394 A | 11/1967 | Longshore | |
| 3,421,533 A | 1/1969 | Conn | |
| 3,474,828 A | 10/1969 | Wheeler et al. | |
| 3,485,225 A | 12/1969 | Bailey et al. | |
| 3,533,431 A | 10/1970 | Kuenzel et al. | |
| 3,536,085 A | 10/1970 | Taplin | |
| 3,540,695 A | 11/1970 | Taylor | |
| 3,587,647 A | 6/1971 | Walters | |
| 3,635,436 A | 1/1972 | Tillman | |
| 3,662,950 A | 5/1972 | McIntosh et al. | |
| 3,683,694 A | 8/1972 | Granberg | |
| 3,749,122 A | 7/1973 | Gold | |
| 3,797,525 A | 3/1974 | Lieser | |
| 3,949,645 A | 4/1976 | Masclet | |
| 4,220,174 A | 9/1980 | Spitz | |
| 4,240,634 A | 12/1980 | Wiczer | |
| 4,253,481 A | 3/1981 | Sarlls, Jr. | |
| 4,263,938 A | 4/1981 | Peters | |
| 4,281,677 A | 8/1981 | Hoffman | |
| 4,336,946 A | 6/1982 | Wheeler | |
| 4,396,071 A | 8/1983 | Stephens | |
| 4,444,216 A | 4/1984 | Loup | |
| 4,475,568 A | 10/1984 | Loup | |
| 4,491,154 A | 1/1985 | Peters | |
| 4,493,335 A | 1/1985 | Watson | |
| 4,554,940 A * | 11/1985 | Loup | F16K 11/0655 137/115.15 |
| 4,793,590 A | 12/1988 | Watson | |
| 4,856,557 A * | 8/1989 | Watson | F16K 3/0209 137/625.25 |
| 4,877,057 A | 10/1989 | Christensen | |
| 4,890,645 A | 1/1990 | Andersen | |
| 4,968,197 A | 11/1990 | Chen | |
| 5,035,265 A | 7/1991 | Chen | |
| 5,069,240 A | 12/1991 | Kurkjian, Jr. | |
| 5,190,078 A | 3/1993 | Stoll et al. | |
| 5,301,637 A | 4/1994 | Blount | |
| 5,771,931 A | 6/1998 | Watson | |
| 5,797,431 A | 8/1998 | Adams | |
| 5,901,749 A | 5/1999 | Watson | |
| 6,041,804 A | 3/2000 | Chatufale | |
| 6,257,268 B1 | 7/2001 | Hope et al. | |
| 6,264,206 B1 | 7/2001 | Hashizawa et al. | |
| 6,296,008 B1 | 10/2001 | Boyer et al. | |
| 6,318,400 B1 | 11/2001 | Hope et al. | |
| 6,382,256 B2 | 5/2002 | Kim et al. | |
| 6,520,478 B1 | 2/2003 | Hope et al. | |
| 6,523,613 B2 * | 2/2003 | Rayssiguier | E21B 23/006 166/320 |
| 6,651,696 B2 | 11/2003 | Hope et al. | |
| 6,702,024 B2 | 3/2004 | Neugebauer | |
| 6,843,266 B2 | 1/2005 | Hope et al. | |
| 6,983,803 B2 | 1/2006 | Watson et al. | |
| 7,000,890 B2 * | 2/2006 | Bell | E21B 33/0355 251/129.15 |
| 7,073,590 B2 | 7/2006 | Neugebauer et al. | |
| 7,159,605 B2 | 1/2007 | Thrash, Jr. et al. | |
| 7,520,297 B2 | 4/2009 | Bell et al. | |
| 7,628,170 B2 | 12/2009 | Kok-Hiong et al. | |
| 7,784,553 B2 | 8/2010 | Moreno | |
| 7,959,161 B2 | 6/2011 | Seki et al. | |
| 8,052,119 B2 * | 11/2011 | Numazaki | F16K 1/36 251/282 |
| 8,246,055 B2 | 8/2012 | Asplund et al. | |
| 8,342,202 B2 | 1/2013 | Nishio et al. | |
| 8,397,742 B2 | 3/2013 | Thrash et al. | |
| 8,408,244 B2 | 4/2013 | Gilcher | |
| 8,469,059 B1 | 6/2013 | Forst | |
| 8,474,792 B2 * | 7/2013 | Kubo | F16K 1/36 251/266 |
| 9,121,244 B2 | 9/2015 | Loretz et al. | |
| 9,297,462 B2 | 3/2016 | Hattori et al. | |
| 9,334,946 B1 | 5/2016 | Mason | |
| 9,423,031 B2 | 8/2016 | Weintraub et al. | |
| 9,874,282 B2 | 1/2018 | Wetzel et al. | |
| 2004/0173976 A1 | 9/2004 | Boggs | |
| 2004/0262007 A1 | 12/2004 | Neugebauer et al. | |
| 2005/0028864 A1 | 2/2005 | Thrash et al. | |
| 2006/0137744 A1 * | 6/2006 | Anastas | F16K 1/36 137/487.5 |
| 2006/0237064 A1 * | 10/2006 | Benson | F16K 1/36 137/487.5 |
| 2007/0000544 A1 * | 1/2007 | Thompson | F04B 53/1022 137/516.23 |
| 2007/0069576 A1 | 3/2007 | Suzuki | |
| 2007/0113906 A1 | 5/2007 | Sturman et al. | |
| 2010/0044605 A1 | 2/2010 | Veilleux | |
| 2010/0140881 A1 | 6/2010 | Matsuo | |
| 2010/0154896 A1 | 6/2010 | Thrash, Jr. et al. | |
| 2010/0243084 A1 | 9/2010 | Yoshioka et al. | |
| 2011/0253240 A1 | 10/2011 | Otto et al. | |
| 2013/0032222 A1 | 2/2013 | Bresnahan | |
| 2013/0037736 A1 | 2/2013 | Bresnahan | |
| 2013/0146303 A1 | 6/2013 | Gustafson | |
| 2013/0181154 A1 * | 7/2013 | Robison | F16K 5/08 251/324 |
| 2014/0116551 A1 | 5/2014 | Smith | |
| 2014/0377111 A1 | 12/2014 | Bagagli et al. | |
| 2015/0152959 A1 | 6/2015 | Mangiagli et al. | |
| 2015/0191996 A1 | 7/2015 | Weintraub | |
| 2015/0191997 A1 | 7/2015 | Weintraub et al. | |
| 2015/0276083 A1 * | 10/2015 | Druhan | F16K 31/041 251/129.11 |
| 2015/0369002 A1 | 12/2015 | Patterson | |
| 2016/0103456 A1 | 4/2016 | Cho et al. | |
| 2016/0123478 A1 | 5/2016 | Wetzel et al. | |
| 2016/0258531 A1 * | 9/2016 | Ito | F16H 9/18 |
| 2016/0258537 A1 | 9/2016 | Heiderman et al. | |
| 2017/0037984 A1 | 2/2017 | Frippiat et al. | |
| 2017/0097100 A1 | 4/2017 | Patterson | |
| 2017/0175916 A1 | 6/2017 | Huynh et al. | |
| 2017/0189730 A1 | 7/2017 | Ernfjall | |
| 2017/0220054 A1 | 8/2017 | Zhu et al. | |
| 2017/0241563 A1 | 8/2017 | Simpson | |
| 2017/0260831 A1 | 9/2017 | Green | |
| 2017/0314689 A1 | 11/2017 | Osterbrink et al. | |
| 2017/0370481 A1 | 12/2017 | Glazewski | |

OTHER PUBLICATIONS

PCT International Search Report and Written Opinion dated Jan. 31, 2018, for International Application No. PCT/US2017/051550.

PCT International Search Report and Written Opinion dated Jun. 23, 2015, for International Application No. PCT/US2014/062114.

* cited by examiner

LOW FRICTION HYDRAULIC CIRCUIT CONTROL COMPONENTS

CROSS-REFERENCE TO RELATED APPLICATIONS

This application claims benefit of U.S. provisional patent application Ser. No. 62/394,798, filed Sep. 15, 2016, which is herein incorporated by reference.

BACKGROUND OF THE INVENTION

Field of the Invention

The present disclosure relates to the field of fluid control components. More particularly, the present disclosure relates to the field of hydraulic valves and regulators used to control fluid operated devices, such as other valves and components including oilfield well drilling and production equipment, such as surface and subsea blowout preventers.

Description of the Related Art

Hydraulic valves are used to control the opening and closing of hydraulically operated oilfield well drilling and production equipment such as additional valves or blowout preventers. Regulators are used to control the pressure in a hydraulic circuit to ameliorate pressure spikes which can occur when hydraulic valves in the circuit are opened or closed. Variable orifices are used to selectively pass pressure and fluid therethrough at levels between full fluid flow and pressure and no fluid flow and pressure, and thus regulate the fluid pressure downstream therefrom. Pressure regulators are used to maintain a desired pressure in the hydraulic control circuit. The hydraulic control circuit components are commonly provided with redundancy, to ensure that when required to, for example, operate a blowout preventer to close off a well bore being drilled, the hydraulic control circuit will deliver the required fluid in the required time with sufficient volume and pressure to close the blowout preventer.

One recurring limitation in hydraulic valves and regulators, which use pressurized fluid or an electromechanical actuator to cause at least one valve component to move with respect to another valve component, is stiction, which is the static friction present between two stationary surfaces in contact with one another. Typically, the force needed to overcome stiction to allow one surface to move with respect to the other is greater than the force needed to cause two surfaces in contact with each other to continue moving with respect to each other once movement therebetween has started. As a result, it is known in the art that up to 20% of the total force, and thus of the total energy, supplied to a hydraulic valve can be taken up to overcome stiction. In the regulator, where dead bands on the order of 20 to 30% are known to occur in current designs, hunting, or oscillating around the outlet pressure setpoint, is a continuing issue affecting the operation of the hydraulic circuit. Pressure oscillations in the line or conduit opened by the valve when a valve is opened on the order of 1400 psi decreases and 600 psi increases are known to occur.

An additional issue present in hydraulic circuit control components is reliability of the hydraulic control component due to wear and corrosion of the components, caused by the exposure of the components to erosive and corrosive hydraulic operating fluids, and by relative movement of the components with respect to each other. Corrosion and erosion of the relatively moving parts can generate debris tending to cause these components to become locked, or move erratically, with respect to each other, and corrosion, erosion and wear can cause sliding interface between components to leak, reducing the effectiveness and reliability of the hydraulic control circuit component. In either case, the hydraulic circuit component will require repair or replacement, which in a subsea environment is expensive where servicing of the components often requires the use of a submersible robot to remove or service a hydraulic circuit component. To prevent the hydraulic control circuit from becoming non-functional as a result of a failure of a hydraulic control component, and to reduce the number of service operation periods in which a submersible robot is used to replace components, subsea control systems often have even greater redundancy requiring even more redundant hydraulic circuits and attendant components, leading to even greater cost.

To help reduce wear, the hydraulic control circuit components which include sliding contact surfaces have been made from, or coated with, carbide materials. However relatively high stiction occurs between two closely fitted, but movable with respect to each other, carbide surfaces. As a result, to operate these hydraulic circuits, fluid maintained at relatively high pressures is required. A substantial amount of energy is used to pressurize the fluid, and large accumulators are needed to store the fluid under the high pressure. Because of the need for redundant components systems, these costs are magnified where stiction is a large factor in the operational energy needed to operate the valve.

Additionally, carbide based components are brittle in comparison to stainless steel components, and for example, where two such parts of a component must be moved into sealing engagement, slower component velocities resulting in lower engagement forces are used to ensure the components does not fracture, crack or create particles of the component which can become lodged between moving surfaces and lock the moving parts in place. As a result, slower valve operation than optimal results.

SUMMARY OF THE INVENTION

Embodiments herein provide a lower friction and higher wear and corrosion resistance sliding interface in hydraulic component sliding interfaces. In one aspect, the sliding interface includes single crystal coatings or inserts on the part surfaces in sliding contact.

In another aspect, the hydraulic component parts having sliding surface interfaces are configured of a single crystal material. In yet another aspect, those parts having a sliding surface are configured of single crystal sapphire. Alternatively, one of the parts having a sliding surface interface is configured of the single crystal material, for example single crystal sapphire, and the sliding surface of the other component is coated with, or includes an insert forming the sliding surface, of a single crystal material such as ruby.

In another aspect, the single crystal material can be sapphire or ruby, and one sliding surface can comprise ruby, and the other sapphire, either as a coating, an insert, or the composition of the entire part.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Herein, hydraulic operating valves, regulators and other hydraulic control circuit components are configured wherein internal components thereof which move relative to one another or engage one another are configured of a single crystal material, such as ruby or sapphire, and as a result lower friction sliding interfaces, less component wear, and a reduction in the wear and corrosion of these components is achieved. Descriptions of applications of the single crystal material in a number of selected hydraulic circuit control components are provided herein. While not exhaustive of the applicability of the single crystal material, they are intended to provide exemplars of use of the single crystal material and not to limit the scope of the invention described herein.

Figure 1:
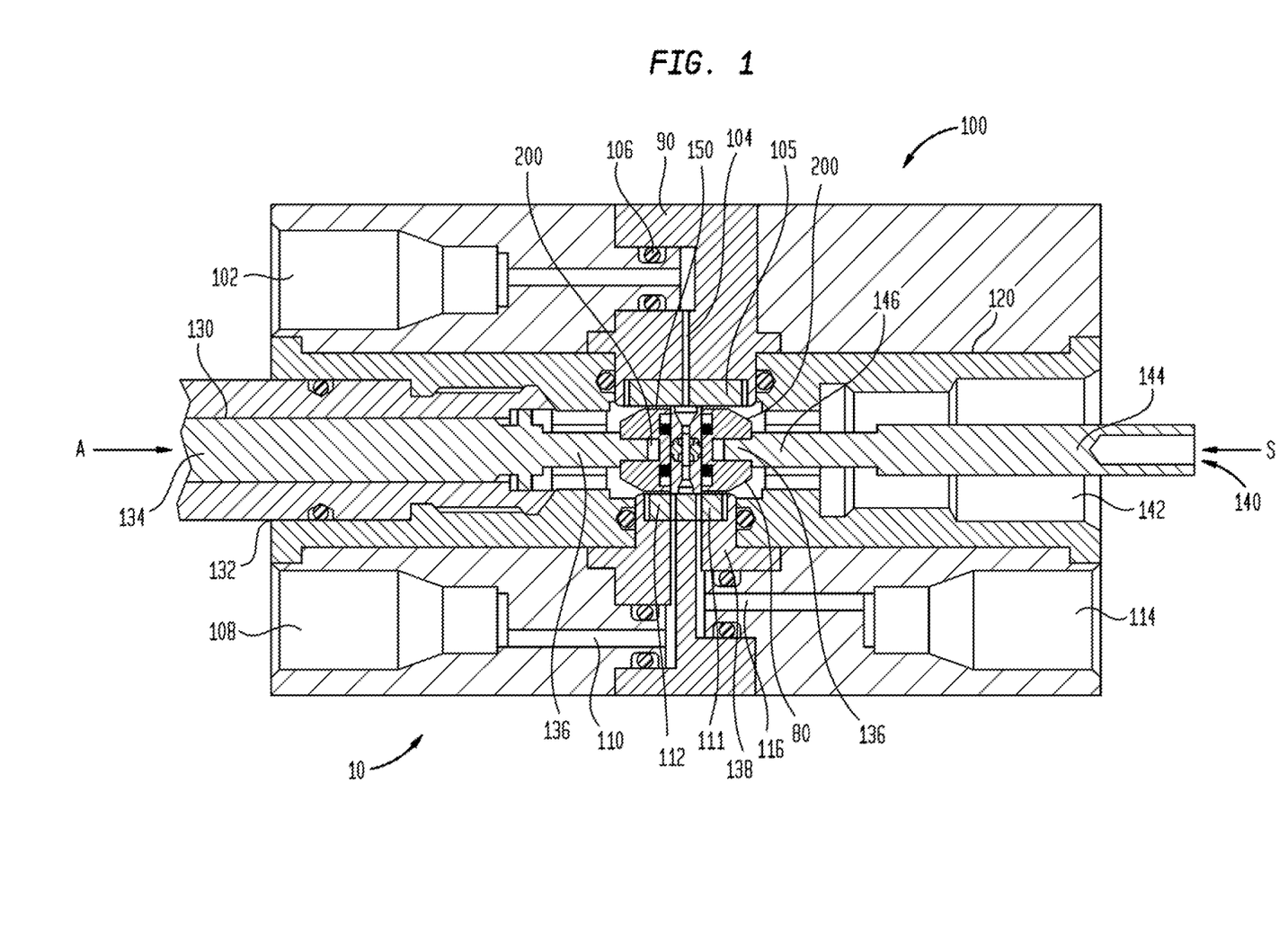
FIG. 1 is a sectional view of a shear seal style valve.
Figure 2:
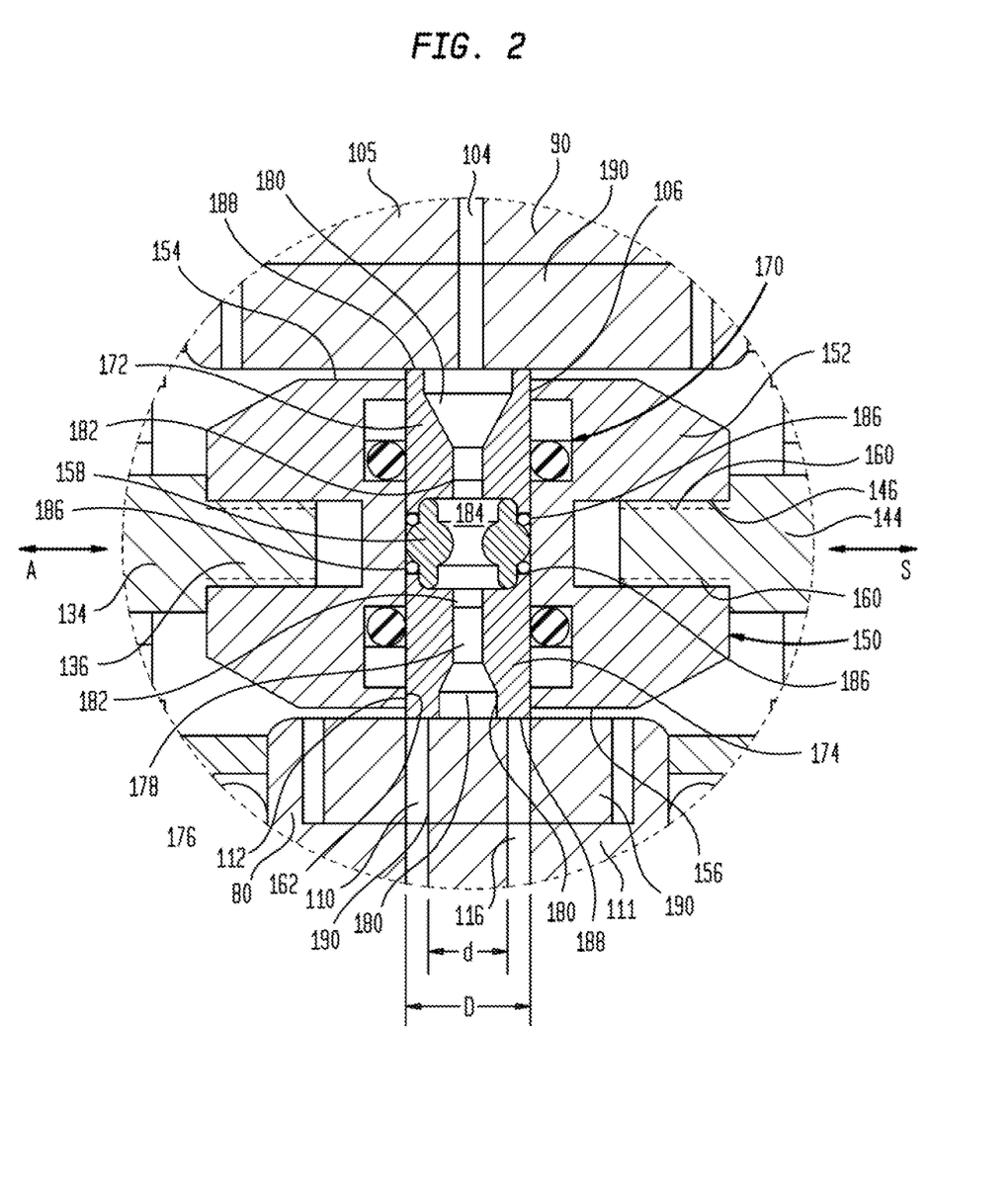
FIG. 2 is an enlarged view of a portion of FIG. 1, showing the seal carrier and sealing elements in greater detail.
Figure 3:
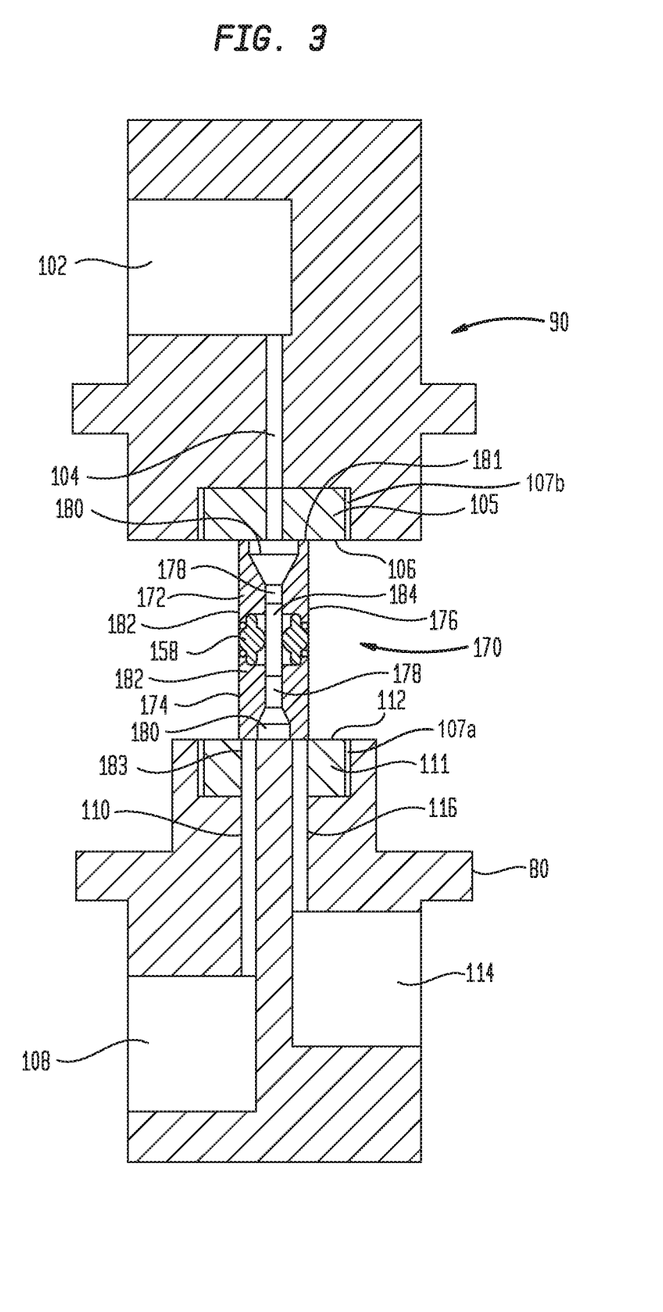
FIG. 3 is a sectional view of a bidirectional seal assembly and opposed seal plate assemblies wherein the bidirectional seal assembly blocks the outlet passages of the valve.

Referring to FIGS. 1 and 2, a four way, two position valve 10 is shown in section, wherein certain internal components thereof are configured from, or include inserts configured from, a single crystal material such as ruby or sapphire. In FIG. 3, the valve components that form the sealing and fluid path switching are shown in section, without the accompanying valve body and attendant operational elements of the valve. The valve of FIGS. 1 and 2 comprises a valve body 100, an inlet body 90, and outlet body 80, a drive actuator 130, a compensation or return actuator 140, and a seal carrier 150. A shear seal assembly 138 is provided in the seal carrier 150. The valve body 100 is configured of stainless steel or other high strength metal, and includes therein the inlet body 90 having an inlet 102 ported, through an inlet body passage 104, to a first seal plate 105 having a sealing surface 106 into which the inlet passage 104 opens, and an outlet body 80 having a first outlet 108 connected, through first outlet body passage 110 to a second sealing plate 111 having a second sealing surface 112 into which the first outlet body passage 110 opens, and a second outlet 114 connected through a second outlet passage 116 to the second sealing plate 111 second sealing surface 112, into which second outlet passage 116 opens. Inlet body passage 104 intersects first seal plate sealing surface 106 generally perpendicular to the planar surface thereof, and each of the first and second outlet body passages 110, 116 intersect the second seal plate sealing surface 112 generally perpendicular thereto. The first and second outlet body passages 110, 116 are spaced from each other at the second seal plate surface 112 by a distance d (FIG. 2).

Body 100 further includes a cross bore 120 extending therethrough generally perpendicular to the portions of the inlet passage 104 and the outlet body passages 110, 116 opening into the seal plate sealing surfaces 106, 112. The drive actuator 130 extends inwardly of a first opening 132 of the cross bore 120 and thus into the body 100, and includes a drive rod 134 terminating inwardly of the body 100 in a threaded boss 136. An actuator, such as a mechanical or electromechanical drive, to push the drive rod 134 inwardly of the opening 132, is shown schematically as the force arrow "A". Additionally, the actuator may be a hydraulically operated piston. The compensation actuator 140 extends inwardly of the second opening 142 of the cross bore 120 into the body 100. Compensation actuator 140 includes a compensation drive rod 144 which terminates inwardly of the valve 100 in a threaded compensation rod boss 146. In the embodiment, a spring, not shown but schematically represented by force arrow S, provides a return force to re-center the carrier 150 in the valve 10 between the seal plate sealing surfaces 106, 112.

Referring to FIG. 2, the seal carrier 150 is shown in section and enlarged, and includes a body 152 having opposed, parallely disposed, upper and lower surfaces 154, 156, a threaded drive rod opening into which the threaded boss 136 of the drive rod is threadingly secured, and an opposed threaded compensation rod boss opening 160, into which the treaded compensation rod boss 146 is threadingly received. A seal bore 162 extends through the carrier 150 and opens through the upper and lower surfaces 154, 156.

As shown best in FIG. 3, bidirectional seal assembly 170 is received within a generally right cylindrical in section seal bore 162 and includes a first sealing element 172 located adjacent to the upper surface 154, a second sealing element 174 located adjacent to the lower surface 156, and a biasing element 158 interposed between the first and second sealing elements in the seal bore 162, and configured to bias the sealing elements 172, 174 outwardly of the upper and lower surfaces 154, 156 respectively. Each of the first and second sealing elements 172, 174 have a generally right cylindrical outer surface 176 and a bore 178 therethrough opening, at the first or second side thereof, respectively, in an outwardly tapered countersink opening 180. The first and second seal elements 172, 174 are preferably identical within machining tolerances, and thus interchangeable. The bore 178 opens, at the end thereof opposite to countersunk opening 180, into an enlarged diameter counter bore 182, such that the counterbores 182 of each sealing element 172, 174 face each other within the seal bore 162. An alignment tube 184 extends inwardly of the opposed counterbores 182 to maintain alignment between the two sealing elements 172, 174 and form a continuous flow passage between the bores 178 thereof and thus through the seal bore 162. A small clearance gap, on the order of 1 to 5 thousandths of an inch, is present between the tube 184 and the surfaces of the counterbores 182.

Figure 6:
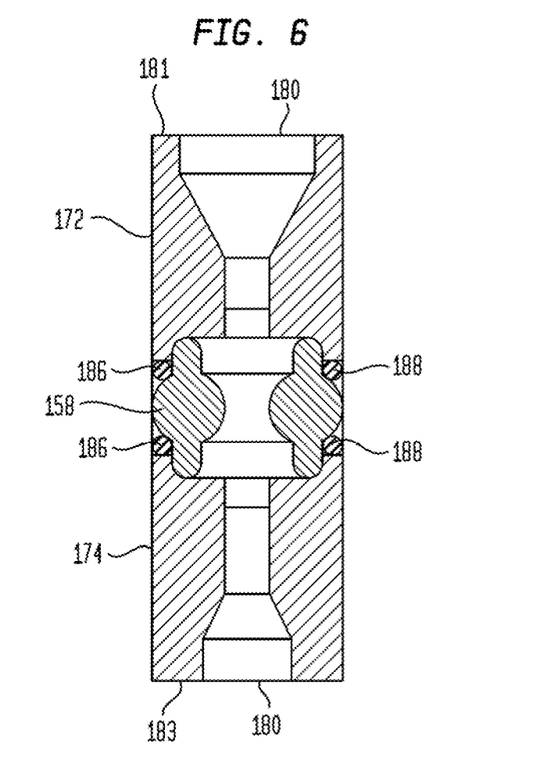
FIG. 6 is an enlarged sectional view a bidirectional seal assembly useful in the valve of FIG. 1.
Figure 7:
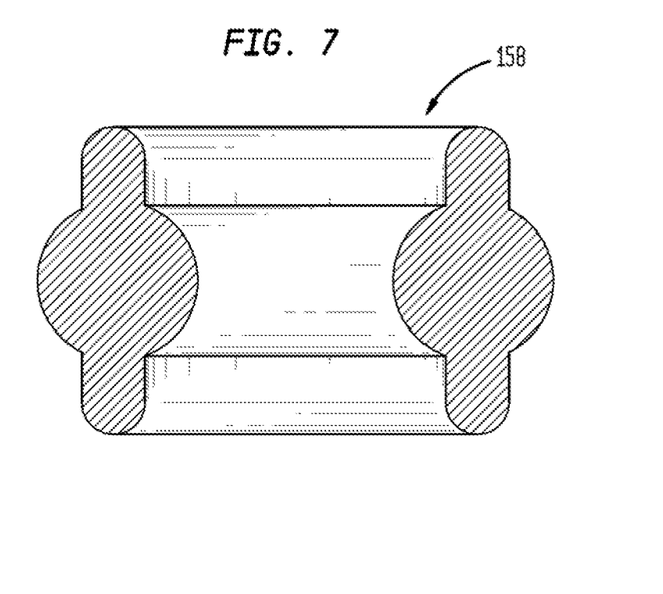
FIG. 7 is a sectional view of a seal used in the bidirectional seal assembly of FIG. 6.

The first and second seal elements 172, 174 are, in the embodiment, right cylindrical elements having the same outer diameter, the same bore 178 diameter and the same counterbore diameter. However, the inner diameter of countersunk opening of the first sealing element 172 facing the first seal plate 105 has a smaller diameter than the countersunk opening 180 of the second seal element 174 facing the second sealing plate 111. The first seal element thus includes a first annular seal face 181 having a first area extending between the countersunk opening 180 of the first seal element 172 and the outer diameter thereof, and the second seal element 174 includes a second annular seal face 183 having a first area extending between the countersunk opening 180 of the second seal element 174 and the outer diameter thereof. The area of the second seal face 183 is greater than that of first annular seal face 181. The opening diameter of the countersunk opening 180 in the second seal element at the annular seal face is slightly less than the closest spacing "d" between the outlet body passages 110, 116 at the second sealing surface 112, and the outer diameter of the outer surfaces 176 of the first and second seal elements 172, 174 is slightly larger than the largest distance "D" across the adjacent outlet body passages 110, 116. A biasing element 158, such as the key seal structure illustrated in FIG. 7 and in co-pending U.S. application Ser. No. 14/067,398 filed Oct. 30, 2013, which is herein incorporated by reference, is located between the back side 186 surfaces of the sealing elements 172,174 to bias them outwardly of the seal bore 162. Backing rings 188 (FIG. 6), or other elements to ensure the integrity of the biasing element, may be provided between the biasing element 158 and the back side 186 surfaces.

Figure 4:
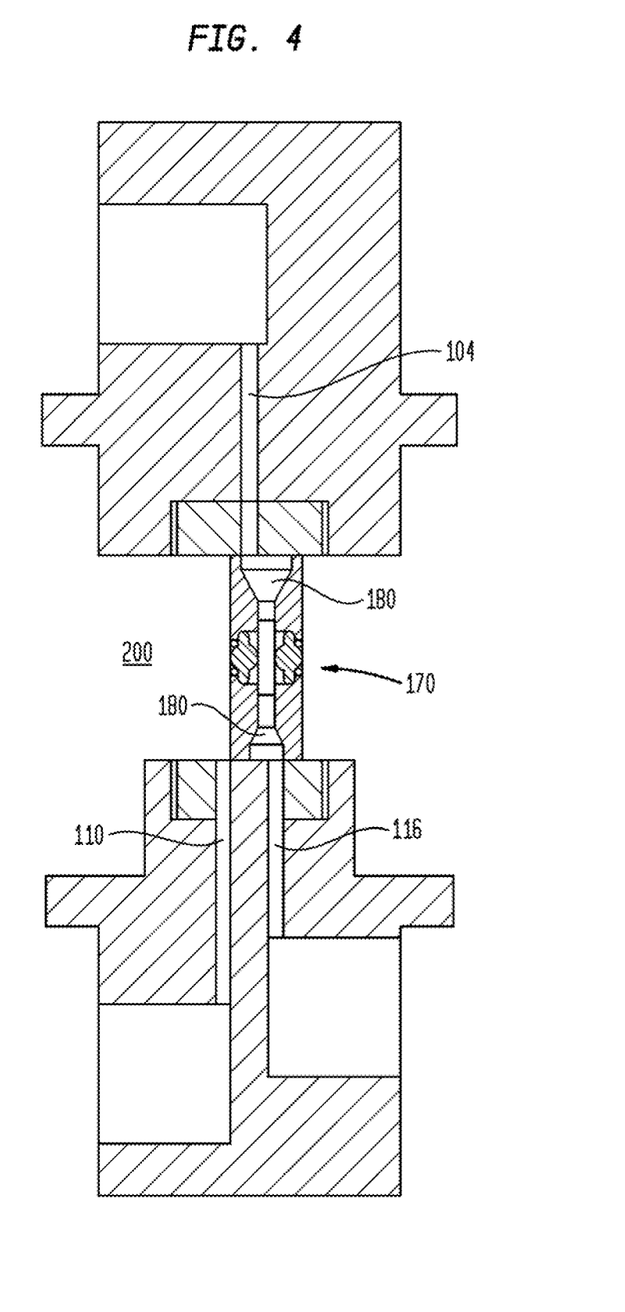
FIG. 4 is a sectional view of a bidirectional seal assembly and opposed seal plate assemblies wherein the bidirectional seal assembly is moved from the position thereof to allow fluid to flow from an inlet passage to a first of two outlet passages.
Figure 5:
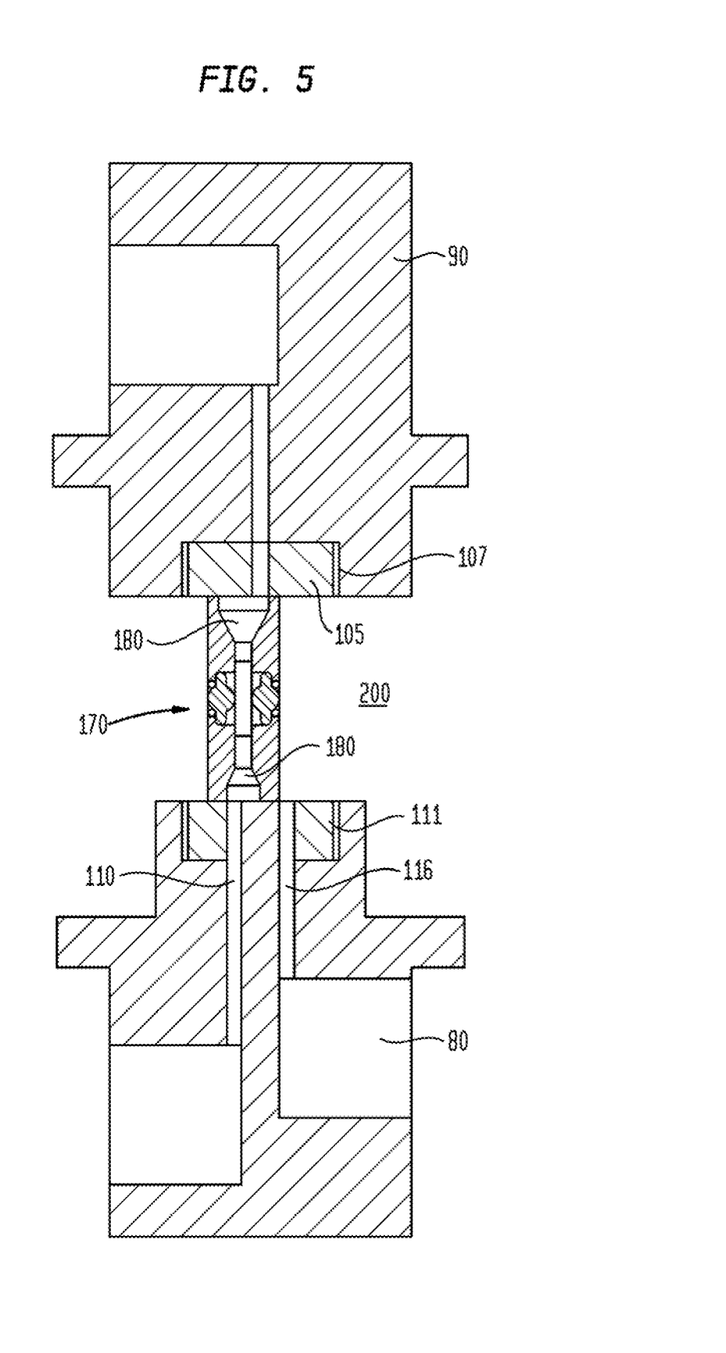
FIG. 5 is a sectional view of a bidirectional seal assembly and opposed seal plate assemblies wherein the bidirectional seal assembly is moved from the position thereof to allow fluid to flow from an inlet passage to a second of two outlet passages.

In the embodiment, the first and second sealing plates 105, 111 providing the sealing surfaces 106, 112 are provided as an insert 190, each having continuation passages extending therethrough to communicate with the inlet passage 104 and outlet body passages 110, 116 of the body 100. In the embodiment, both of the inserts 190, and both of the two sealing elements 172, 174, are configured as a single crystal material. The single crystal material is preferably chosen from among a single crystal ruby and a single crystal sapphire. In operation, the carrier 150 is moveable in the direction of arrows A and S, to selectively align the passage formed through the tube 184 and the countersunk openings 180 therein with the inlet passage 104 and either one or the other of the outlet body passages 106, 116 to allow flow from the inlet passage 102 to one of the outlets 108, 114, or to prevent flow from the inlet passage 104 to either one or the other of the outlet body passages 110, 116 by aligning the first and second annular sealing surface 190 to block the outlet body passages 110, 116. These relative positions of the bidirectional seal assembly 170 are shown in FIGS. 3 to 5. The first and second sealing plates 105, 111 are eutectic bonded to the underlying stainless steel inlet body 90 and outlet body 80 in recesses 107a, 107b provided in the outlet and inlet bodies 80, 90.

In operation, the bidirectional seal assembly 170 is positionable to selectively allow, or block, fluid flow from inlet passage 104 to one of the outlet body passages 110, 116. In FIGS. 1, 2 and 3, the bidirectional seal assembly 170 is positioned such that countersunk opening in the first sealing element 172 is aligned with the inlet passage, and the second annular seal face 183 overlies, and covers both outlet body passages 110, 116. In FIG. 4, the carrier 150 (FIGS. 1 and 2) has moved the bidirectional seal assembly 170 from the position of FIG. 3, such that inlet passage 104 communicated with outlet passage body 116, and outlet passage body 110 is exposed to the interior volume of the valve, which may be configured with a vent passage to thereby vent the pressure in the outlet passage 110. In FIG. 5, the carrier 150 (FIGS. 1 and 2) has moved the bidirectional seal assembly 170 from the position of FIG. 3, such that inlet passage 104 communicated with outlet passage body 110, and outlet body passage 116 is exposed to the interior volume of the valve, which may be configured with a vent passage to thereby vent the pressure in the outlet body passage 116.

Figure 8:
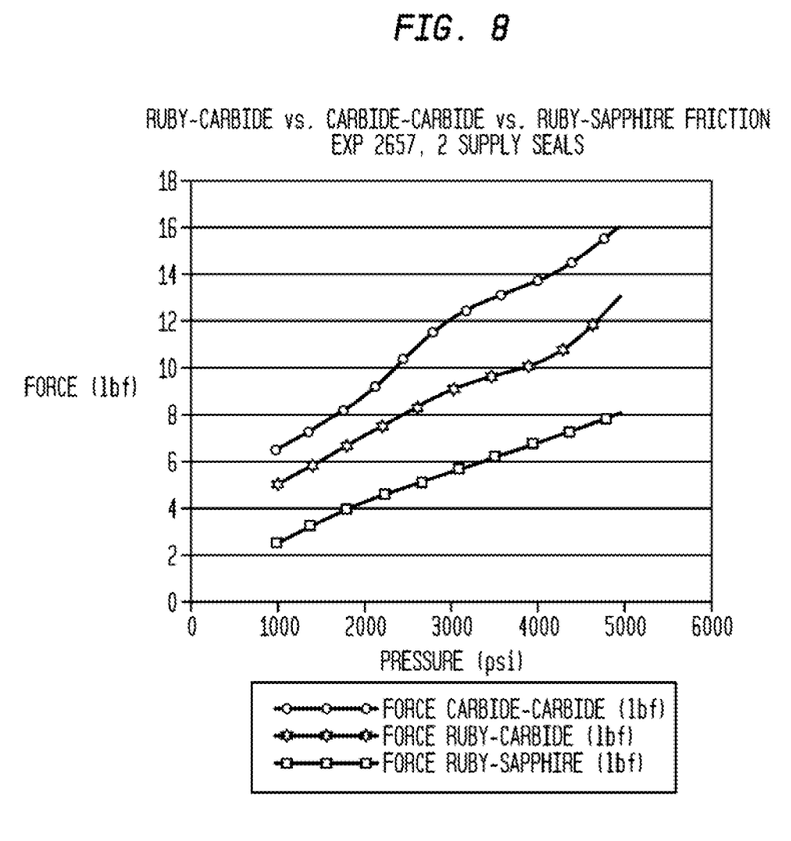
FIG. 8 is a graph showing the force required to begin moving the seal carrier with respect to the seal plate surfaces of the valve of FIG. 1.

FIG. 8 is a graph showing the force needed to move the carrier with respect to the seal plate sealing surfaces 106, 112 as a function of the pressure at the inlet passage 102 for different sealing element 172, 174 materials and different sealing plate 105, 111 materials. Using the valve of FIGS. 1 and 2, a load cell was interposed between an electromechanical actuator and the drive rod 134, and no spring return was present, and the force needed to move the carrier 150 from the position of FIGS. 1 and 2 to the right or to the left of FIGS. 1 and 2 was measured at a series of discrete inlet pressures using a valve with three different sealing element 172, 174 and sealing plate 105, 111 material combinations: Carbide to carbide, carbide to ruby, and ruby to sapphire. In the valve, the first annular seal face 181 had a surface area of approximately 0.0091 square inches, and the second annular seal face 183 had a surface area of approximately 0.0117 square inches. As shown in FIG. 3, the force in pounds-force (lbf) increases as the fluid pressure, in psi on the inlet 104 increases. However, by using a single crystal material as the material of the sealing elements 172, 174 and/or the sealing plates 105, 111 and thus the sealing surfaces 106, 112, a significant reduction in the initial force, and thus the stored hydraulic energy required to initiate movement of the sealing elements 172, 174 with respect to the sealing surfaces 106, 112, is achieved. For example, at an inlet pressure of 1000 psi, over 6 lbf are required to move the sealing elements 172, 174 and sealing surfaces 106, 112 with respect to each other when both are configured from tungsten carbide. By changing one of the sealing elements 172, 174 or sealing surfaces 106, 112 to ruby, that force requirement is reduced to approximately 5 lbf, and when configuring one of the sealing elements 172, 174 and sealing surfaces 106, 112 of ruby, and the other of the sealing elements 172, 174 and sealing surfaces 106, 112 of sapphire, the force required to move the sealing elements 172, 174 and sealing surfaces 106, 112 with respect to one another is less than 3 lbf, which is less than one-half that of the carbide-carbide interface. The relative force required to move a ruby to sapphire interface will be the same as a sapphire to sapphire interface.

At higher inlet passage 104 pressures the reduction in force required to move the sealing elements 172, 174 and sealing surfaces 106, 112 with respect to each other is even more pronounced. At about 4500 psi inlet passage 104 pressure, the tungsten carbide to tungsten carbide interface requires over 15 lbf to begin moving, whereas the ruby to carbide interface requires under 12 psi to begin moving, and the ruby to sapphire interface requires less than 8 lbf to begin moving. Thus, at the lower pressure of about 1000 psi, a reduction in force of about 4 lbf, which is ⅓ that required for the carbide to carbide interface is used, is possible using a ruby to sapphire interface. At the higher pressure of about 4500 psi, a reduction in force of about 8 lbf, which is ½ that required for the carbide to carbide interface is used, is possible using a ruby to sapphire interface. It is believed that this is due to the lower electrical affinity of the surface of a single crystal material to an adjacent single crystal surface, as compared to that of a non-single crystal surface to a non-single crystal, or a single crystal, surface.

Figure 9:
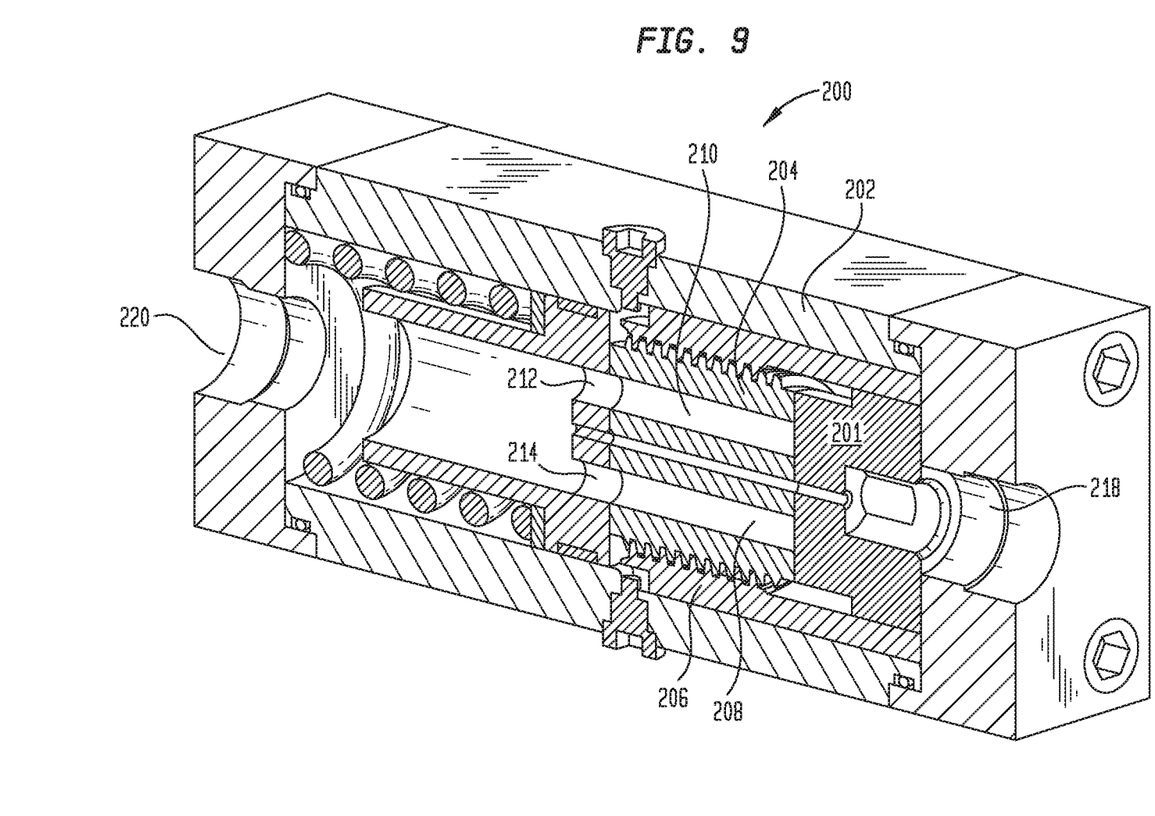
FIG. 9 is a sectional view of an additional valve employing low friction materials in the sliding surfaces thereof.

Referring now to FIG. 9, an additional use example of the use of a single crystal material is shown. In this example, the hydraulic control circuit component is a variable orifice 200, as shown in U.S. patent application Ser. No. 15/191,096, incorporated herein by reference. In this device, when fluid pressure at the inlet 218 experiences an upward spike, that pressure causes a piston 201 to move inwardly of the device body 202 causing an external threaded rotor 204 housed in an internally threaded sleeve 206 to rotate, thereby causing flow passages 208, 210 in the rotor 204 to partly to wholly in come into alignment with corresponding passages 212, 214 in a guide sleeve 216, allowing restricted or full flow therethrough to the outlet 220 enabling the pressure spike to be relieved. Once the excess pressure is reduced a the inlet 218, a spring 222 causes the rotor to return to the condition where the passages 208, 210 therein are no longer fully or partially aligned with passages 212, 214, closing of the flow path. In this device, using single crystal materials such as ruby and sapphire as the sleeve 206 and the rotor 204, or as inserts to provide the threaded engagement therebetween, will reduce the stiction resulting in a lower operating fluid pressure (force) and thus a lower energy to cause the device to operate.

In addition to sapphire and ruby single crystal materials, the inventor hereof has discovered that a sliding interface comprising at least one zirconia surface results in reduced stiction as compared to a carbide-carbide sliding interface under the same operating conditions. For example, where one of the two surfaces having relative sliding motion with respect to each other is configured of Zirconia and the other of tungsten carbide, under the same operating conditions, a reduction of stiction, on the order of 20% as compared to a tungsten carbide—tungsten carbide sliding interface results. For example, the inventor hereof has found that the zirconium-yttria blend of approximately 3% Yttria, commonly referred to as tetragonal zirconia polycrystalline material or Zirconia 3T-TZP, used as one surface of the sliding interface, and tungsten carbide as the other surface of the sliding interface, resulted in a reduction of stiction compared to that of a tungsten—carbide-tungsten carbide sliding interface under the same loading conditions. Likewise, the inventor hereof has found that aluminum stabilized zirconia, also known as AZP, used as one surface of the sliding interface, and tungsten carbide as the other surface of the sliding interface, resulted in a reduction of stiction compared to that of a tungsten—carbide-tungsten carbide sliding interface under the same loading conditions. As an alternate embodiment, the use of tungsten carbide against Zirconia, for instance Zirconia 3T-TZP or AZP in sliding contact will also produce a low friction couple as a shear seal. Likewise, a zirconia-zirconia sliding interface will result in a reduction of stiction on the order of 50%.

In addition to having reduced stiction as compared to a carbide-carbide sliding interface, a zirconia-carbide interface has improved manufacturability as compared to sapphire of ruby materials. For example, the sealing elements 172, 174 can be manufactured from Zirconia 3T-TZP or AZP and the sealing plates 105, 111 manufactured of tungsten carbide. Thus, at the interface of the sliding seal plate sealing surfaces 106, 112 and the first and second annular seal faces 181, 183 of FIG. 3, a reduction of stiction of approximately 20% can be achieved over a carbide-carbide interface, and the sealing elements 172, 174 and the sealing plates 105, 111 are more easily, and less expensively, manufactured as compared to where they are manufactured of ruby or sapphire. Additionally, both the tungsten carbide and the Zirconia 3T-TZP can be spray coated, such that the base material of the sealing elements 172, 174 and the sealing plates 105 are manufactured from, for example stainless steel or a another high strength metal, and tungsten carbide is spray coated on one of the sliding seal plate sealing surfaces 106, 112 and the first and second annular seal faces 181, 183, and Zirconia 3T-TZP is spray coated on the other of the sliding seal plate sealing surfaces 106, 112 and first and second annular seal faces 181, 183. Preferably, where the carbide surface is provided by a monolithic, i.e., non-spray coated component, the sealing plates 105, 111 are configured of the more brittle tungsten carbide. Further, the carbide, zirconia, or both materials can be provides as inserts of brazed to an underlying material to form a lower stiction sliding interface. Additionally, as compared to ruby or sapphire materials, Zirconia is more easily machined, and is also susceptible to being machined into more complex shapes and geometries. Furthermore, zirconia itself, as opposed to Zirconia 3T-TZP or AZP, may be used as the sliding surface, either against another zirconia surface, or a carbide surface such as tungsten carbide.

Additionally, ruby-carbide and sapphire-carbide sliding interfaces are also contemplated herein, wherein one of the sealing element 172, 174 and sealing plate 105, 111 is configured of a monolithic carbide such as tungsten carbide or configured from a base material such as stainless steel and the sliding surfaces are provided by spray coating a carbide, such as tungsten carbide thereon, and the other of the sealing element 172, 174 and sealing plate 105, 111 is configured of sapphire or ruby. For example, the inventor hereof has discovered that the sapphire—tungsten carbide interface has a reduced stiction as compared to the tungsten carbide-tungsten carbide interface on the order of 20%, although not as significant as opposed to the 50% possible with Sapphire against Sapphire or Zirconia against Tungsten Carbide. In addition, a sliding interface of a zirconia material and one of sapphire or ruby, a sliding interface where one surface is sapphire and the other is ruby, are specifically contemplated here.

Other devices using hydraulically operated pistons, such as a pressure regulator as shown in U.S. patent application Ser. No. 14/837,192, filed Aug. 27, 2015 and incorporated herein by reference can also benefit from the use of sapphire and ruby components.

As used herein, the use of zirconia, ruby and/or sapphire as the relative sliding surfaces, or combined with a carbide such as tungsten carbide as the other relatively sliding surface, as the components of the sliding interfaces results in a smaller dead zone, lower life as a result of lower wear and high corrosion resistance, and the ability to reduce the size of the stored energy components, such as springs, used to restore the hydraulic circuit component to its rest state.

As contemplated herein, ruby or sapphire, wherein ruby is a doped form of sapphire, are available in sheet or rod form from various supplier such as Saint Gobain of Milford N.H. The sapphire and ruby used herein were ½ light band ruby and 4RA and 2 light band sapphire. The parts, such as the sealing inserts and seal plate surfaces inserts were machined from these materials using diamond cutters, and then lapped to improve surface finish. Where the sliding interface surface is an insert attached to another component, such as a sealing plate assembly, one surface of the insert is metallized, and the metallized surface is then brazed or otherwise connected to an underlying metal component, such as a stainless steel component.

While the foregoing is directed to embodiments of the present invention, other and further embodiments of the invention may be devised without departing from the basic scope thereof, and the scope thereof is determined by the claims that follow.

The invention claimed is:

1. A hydraulic circuit component comprising at least one component having a first surface and a second component having a second surface, wherein the first and second surfaces engage in sliding contact during operation of the component, wherein at least one of the first and second surfaces comprise a non-metal crystalline material;

the hydraulic circuit component further comprising a first seal plate comprising the first surface, a second seal plate, and a carrier having a first sealing element comprising the second surface contacting the first surface and a second sealing element contacting the second seal plate, wherein the first and second sealing elements include the non-metal crystalline material at least at the contact surface of the first surface and the second surface.

2. The hydraulic circuit component of claim 1, wherein the first and second surfaces comprise the crystalline material.

3. The hydraulic circuit of claim 2, wherein the first and second surfaces are provided on inserts.

4. The hydraulic circuit of claim 2, wherein at least one of the first and second surfaces of the sealing elements comprises ruby.

5. The hydraulic circuit of claim 2, wherein at least one of the first and second surfaces of the sealing elements comprises sapphire.

6. The hydraulic circuit of claim 1, wherein at least one of the first and second surfaces of the sealing elements comprises a polycrystalline material.

7. The hydraulic circuit of claim 6, wherein the polycrystalline material is zirconia.

8. The hydraulic circuit component of claim 1, wherein the non-metal crystalline material is provided as an insert.

9. The hydraulic circuit component of claim 1, wherein the non-metal crystalline material is provided as a coating.

10. The hydraulic circuit component of claim 1, wherein at least one of the first seal plate, second seal plate, first sealing element and a second sealing element comprises a single crystal.

11. A hydraulic circuit component comprising at least one component having a crystalline first surface and a second component having a second surface, the crystalline first surface and the second surface biased toward one another by a biasing force, and configured to move with respect to one another while maintaining contact of at least portions thereof during movement thereof with respect to each other, the hydraulic circuit component, further comprising a first seal plate surface comprising the first surface, a second seal plate surface, and a carrier having a first sealing element comprising the second surface contacting the first seal plate surface and a second sealing element contacting the second seal plate surface, wherein the first and second sealing elements include the crystalline material at least at the contact surface thereof with the first seal plate surface and the second seal plate surfaces.

12. The hydraulic circuit component of claim 11, wherein the first and second seal plate surfaces comprise the crystalline material.

13. The hydraulic circuit of claim 12, wherein the first and second seal plate surfaces are provided on inserts.

14. The hydraulic circuit of claim 12, wherein at least one of the first and second seal plate surfaces or the first and second sealing elements comprises ruby.

15. The hydraulic circuit of claim 12, wherein at least one of the seal plate first and second surfaces or the first and second sealing elements comprises sapphire.

16. The hydraulic circuit of claim 12, wherein at least one of the crystalline first surface and the second surface or the first and second sealing elements comprises a single crystal.

* * * * *